(12) United States Patent
Lee

(10) Patent No.: US 11,565,676 B2
(45) Date of Patent: Jan. 31, 2023

(54) ELECTRIC BRAKE SYSTEM

(71) Applicant: HL MANDO CORPORATION, Gyeonggi-do (KR)

(72) Inventor: Jin Seok Lee, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 596 days.

(21) Appl. No.: 16/425,882

(22) Filed: May 29, 2019

(65) Prior Publication Data
US 2019/0367000 A1 Dec. 5, 2019

(30) Foreign Application Priority Data
May 30, 2018 (KR) .................. 10-2018-0061591

(51) Int. Cl.
*B60T 13/68* (2006.01)
*B60T 7/04* (2006.01)

(52) U.S. Cl.
CPC ............ *B60T 13/686* (2013.01); *B60T 7/042* (2013.01); *B60T 2220/04* (2013.01); *B60T 2270/82* (2013.01)

(58) Field of Classification Search
CPC .... B60T 13/686; B60T 7/042; B60T 2220/04; B60T 2270/82
USPC ........................................................... 303/3
See application file for complete search history.

(56) References Cited

U.S. PATENT DOCUMENTS

| | | | |
|---|---|---|---|
| 8,622,486 B2* | 1/2014 | Tandler .................. | B60T 8/368 303/10 |
| 9,205,824 B2* | 12/2015 | Feigel .................... | B60T 13/62 |
| 9,308,905 B2* | 4/2016 | Biller .................... | B60T 8/4081 |
| 10,358,037 B2* | 7/2019 | Ueno .................... | B60L 15/2009 |
| 10,576,943 B2* | 3/2020 | Feigel .................. | B60T 13/745 |
| 2007/0114844 A1* | 5/2007 | Maki .................... | B60T 8/3655 303/122.09 |
| 2011/0241419 A1* | 10/2011 | Oh ........................ | B60T 7/042 303/9.62 |
| 2014/0028084 A1* | 1/2014 | Biller .................... | B60T 13/686 303/9.62 |
| 2015/0183411 A1* | 7/2015 | Sakurazawa ......... | B60T 8/3265 701/70 |
| 2015/0367828 A1* | 12/2015 | Oosawa ............... | B60T 17/221 303/6.01 |

(Continued)

FOREIGN PATENT DOCUMENTS

JP 5432880 3/2014
JP 6213730 10/2017

*Primary Examiner* — Robert A. Siconolfi
*Assistant Examiner* — James K Hsiao
(74) *Attorney, Agent, or Firm* — Ladas & Parry, LLP

(57) ABSTRACT

Disclosed is an electronic brake system that includes a master cylinder unit including a master cylinder to which a master cylinder reservoir coupled to generate a hydraulic pressure, a hydraulic block provided with a hydraulic pressure supply device to generate the hydraulic pressure by an electrical signal outputted in response to a displacement of a brake pedal and a hydraulic control unit to transmit the hydraulic pressure discharged from the hydraulic pressure supply device to wheel cylinders provided in each wheel, and disposed to be separated from the master cylinder unit, a hydraulic block reservoir coupled to the hydraulic block, and a connection hose to connect the master cylinder reservoir and the hydraulic block reservoir.

19 Claims, 2 Drawing Sheets

(56) References Cited

U.S. PATENT DOCUMENTS

| | | | |
|---|---|---|---|
| 2015/0375726 A1* | 12/2015 | Roll | B60T 8/4827 |
| | | | 303/3 |
| 2016/0009263 A1* | 1/2016 | Feigel | B60T 8/321 |
| | | | 303/15 |
| 2016/0031326 A1* | 2/2016 | Ueno | B60L 7/26 |
| | | | 303/3 |
| 2016/0090070 A1* | 3/2016 | Tagata | B60T 11/16 |
| | | | 60/533 |
| 2017/0015290 A1* | 1/2017 | Oosawa | B60T 13/146 |
| 2017/0137006 A1* | 5/2017 | Kuhlman | B60T 8/441 |
| 2017/0158184 A1* | 6/2017 | Choi | B60T 13/686 |
| 2017/0210369 A1* | 7/2017 | Lim | B60T 7/042 |
| 2018/0050670 A1* | 2/2018 | Feigel | B60T 13/686 |
| 2018/0265060 A1* | 9/2018 | Maruo | B60T 8/3685 |
| 2019/0092295 A1* | 3/2019 | Jeong | B60T 13/58 |
| 2019/0100183 A1* | 4/2019 | Jung | B60T 8/17 |
| 2019/0299953 A1* | 10/2019 | Spieker | B60T 8/171 |
| 2019/0366997 A1* | 12/2019 | Jeong | B60T 13/686 |
| 2020/0070792 A1* | 3/2020 | Bauer | B60T 8/4081 |

* cited by examiner

ELECTRIC BRAKE SYSTEM

CROSS-REFERENCE TO RELATED APPLICATION(S)

This application is based on and claims priority under 35 U.S.C. § 119 to Korean Patent Application No. 10-2018-0061591, filed on May 30, 2018, in the Korean Intellectual Property Office, the present disclosure of which is incorporated by reference herein in its entirety.

BACKGROUND

1. Technical Field

The present disclosure relates to an electronic brake system, and more particularly, to an electronic brake system for generating a braking force using an electrical signal corresponding to a displacement of a brake pedal.

2. Description of the Related Art

A brake system for braking is essentially installed in a vehicle, and in recent years, various kinds of systems have been proposed to obtain a more powerful and stable braking force.

For example, the brake system includes an anti-lock brake system (ABS) for preventing slippage of wheels during braking, a brake traction control system (BTCS) for preventing drive wheels from slipping when the vehicle suddenly starts or suddenly accelerates, an electronic stability control system (ESC) for stably maintaining the running state of the vehicle by controlling the brake hydraulic pressure by combining the anti-lock brake system and the traction control system, and the like.

While a conventional brake system supplies a hydraulic pressure necessary for braking to wheel cylinders using a mechanically connected booster when a driver depresses a brake pedal, in recent years, an electronic brake system including a hydraulic pressure supply device, which receives an electrical signal corresponding to the braking force of a driver from a pedal displacement sensor that senses a displacement of the brake pedal when the driver presses the brake pedal and supplies a hydraulic pressure necessary for braking to the wheel cylinders, has been widely used.

SUMMARY

It is an aspect of the present disclosure to provide an electronic brake system capable of improving the mountability in a narrow engine room of a vehicle and capable of stably performing braking.

Additional aspects of the present disclosure will be set forth in part in the description which follows and, in part, will be obvious from the description, or may be learned by practice of the present disclosure.

In accordance with an aspect of the present disclosure, an electronic brake system includes a master cylinder unit including a master cylinder to generate a hydraulic pressure and a master cylinder reservoir coupled to the master cylinder to store oil, a hydraulic block provided with a hydraulic pressure supply device to generate the hydraulic pressure by a hydraulic piston actuated by an electrical signal outputted in response to a displacement of a brake pedal and a hydraulic control unit including inlet valves and outlet valves to transmit the hydraulic pressure discharged from the hydraulic pressure supply device to wheel cylinders provided in each wheel, and disposed to be separated from the master cylinder unit, and a hydraulic block reservoir to supply oil to the hydraulic block side or store discharged oil, wherein the hydraulic block includes an inspection flow passage inlet port connected to a reservoir chamber of the master cylinder reservoir, an inspection flow passage outlet port connected to one of two master chambers of the master cylinder, and backup flow passage connection ports connected to the other master chamber of the master cylinder.

The hydraulic block may further include reservoir outlet ports connected to reservoir chambers of the hydraulic block reservoir to transmit oil discharged from the outlet valves.

The backup flow passage connection ports may include a first backup flow passage connection port connected to a first master chamber of the master cylinder and a second backup flow passage connection port connected to a second master chamber of the master cylinder.

The reservoir outlet ports may include a first reservoir outlet port connected to one of the reservoir chambers of the hydraulic block reservoir and a second reservoir outlet port connected to the other of the reservoir chambers of the hydraulic block reservoir.

The electronic brake system may further include a connection hose to connect the master cylinder reservoir and the hydraulic block reservoir.

The hydraulic control unit may include a first hydraulic circuit to control the hydraulic pressure transmitted to two of the wheel cylinders and a second hydraulic circuit to control the hydraulic pressure transmitted to the other two wheel cylinders, and the electronic brake system may further include a first backup flow passage to connect the first backup flow passage connection port and the first hydraulic circuit, and a second backup flow passage to connect the second backup flow passage connection port and the second hydraulic circuit.

The hydraulic control unit may include a first hydraulic circuit to control the hydraulic pressure transmitted to two of the wheel cylinders and a second hydraulic circuit to control the hydraulic pressure transmitted to the other two wheel cylinders, and the hydraulic block may further include a first hydraulic block reservoir flow passage to connect the first reservoir outlet port and the first hydraulic circuit, and a second hydraulic block reservoir flow passage to connect the second reservoir outlet port and the second hydraulic circuit.

In accordance with another aspect of the present disclosure, an electronic brake system includes a master cylinder unit including a master cylinder to generate a hydraulic pressure and a master cylinder reservoir coupled to the master cylinder to store oil, a hydraulic block provided with a hydraulic pressure supply device to generate the hydraulic pressure by a hydraulic piston actuated by an electrical signal outputted in response to a displacement of a brake pedal and a hydraulic control unit including inlet valves and outlet valves to transmit the hydraulic pressure discharged from the hydraulic pressure supply device to wheel cylinders provided in each wheel, and disposed to be separated from the master cylinder unit, a hydraulic block reservoir coupled to the hydraulic block to supply oil to the hydraulic pressure supply device and connected to the outlet valves to store oil discharged from the outlet valves, and a connection hose to connect the master cylinder reservoir and the hydraulic block reservoir.

The hydraulic block may include an inspection flow passage inlet port connected to a reservoir chamber of the master cylinder reservoir, an inspection flow passage outlet port connected to one of two master chambers of the master cylinder, an inspection flow passage connecting the inspection flow passage inlet port and the inspection flow passage outlet port and provided with an inspection flow passage check valve to allow the flow of oil only to the inspection flow passage outlet port, and an inspection valve provided on a bypass inspection flow passage connected to the inspection flow passage in the front and rear of the inspection flow passage check valve.

The master cylinder reservoir may include a plurality of the reservoir chambers divided by partitions, and one of the plurality of reservoir chambers may be connected to the other one of the two master chambers of the master cylinder and another one of the plurality of reservoir chambers may be connected to the inspection flow passage inlet port.

The hydraulic block may include hydraulic flow passages to supply the hydraulic pressure supplied from the hydraulic pressure supply device to the hydraulic pressure control unit, backup flow passage connection ports connected to master chambers of the master cylinder, and backup flow passages connecting the backup flow passage connection ports and the hydraulic flow passages and provided with cut valves.

The hydraulic control unit may include a first hydraulic circuit to control the hydraulic pressure transmitted to two of the wheel cylinders and a second hydraulic circuit to control the hydraulic pressure transmitted to the other two wheel cylinders, and the backup flow passages may include a first backup flow passage connected to the first hydraulic circuit and one of the two master chambers of the master cylinder, and a second backup flow passage connected to the second hydraulic circuit and the other one of the two master chambers of the master cylinder.

A simulator device may be connected to the first backup flow passage to provide a reaction force in response to a pressing force of the brake pedal.

The simulator device may include a simulator chamber which stores oil supplied from a simulator flow passage branched from the first backup flow passage and in which a reaction force piston supported by a reaction force spring is disposed, a simulator valve may be provided on the simulator flow passage on a front side of the simulator chamber, and a rear end side of the simulator chamber may be connected to the hydraulic block reservoir.

The hydraulic pressure supply device may include a cylinder block in which the hydraulic piston is accommodated, a first pressure chamber provided at one side of the hydraulic piston in the cylinder block to be connected to the wheel cylinder, and a second pressure chamber provided at the other side of the hydraulic piston in the cylinder block to be connected to the wheel cylinder.

The hydraulic block reservoir may include a plurality of hydraulic block reservoir chambers divided by partitions, one of the plurality of hydraulic block reservoir chambers may be connected to a first hydraulic circuit of the hydraulic control unit, another may be connected to a second hydraulic circuit of the hydraulic control unit, and another may be connected to a pressure chamber of the hydraulic pressure supply device.

The hydraulic block reservoir may include a plurality of hydraulic block reservoir chambers divided by partitions, and the hydraulic block may include a first hydraulic block reservoir flow passage connected to one of the plurality of hydraulic block reservoir chambers and a first hydraulic circuit of the hydraulic control unit, and a second hydraulic block reservoir flow passage connected to another one of the plurality of hydraulic block reservoir chambers and a second hydraulic circuit of the hydraulic control unit.

The first hydraulic block reservoir flow passage may be connected to a simulator chamber of a simulator device configured to provide a reaction force.

The master cylinder reservoir may include a plurality of reservoir chambers divided by partitions, one of the plurality of reservoir chambers may be connected to a first master chamber of the master cylinder, another may be connected to a second master chamber of the master cylinder, and another may be connected to the hydraulic block reservoir.

The backup flow passages may include a first backup flow passage connected to a first hydraulic circuit of the hydraulic control unit and a second backup flow passage connected to a second hydraulic circuit of the hydraulic control unit, the first backup flow passage may be connected to a first master chamber of the master cylinder by a first master hose connecting the first master chamber and a first backup flow passage connection port of the hydraulic block, and the second backup flow passage may be connected to a second master chamber of the master cylinder by a second master hose connecting the second master chamber and a second backup flow passage connection port of the hydraulic block.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
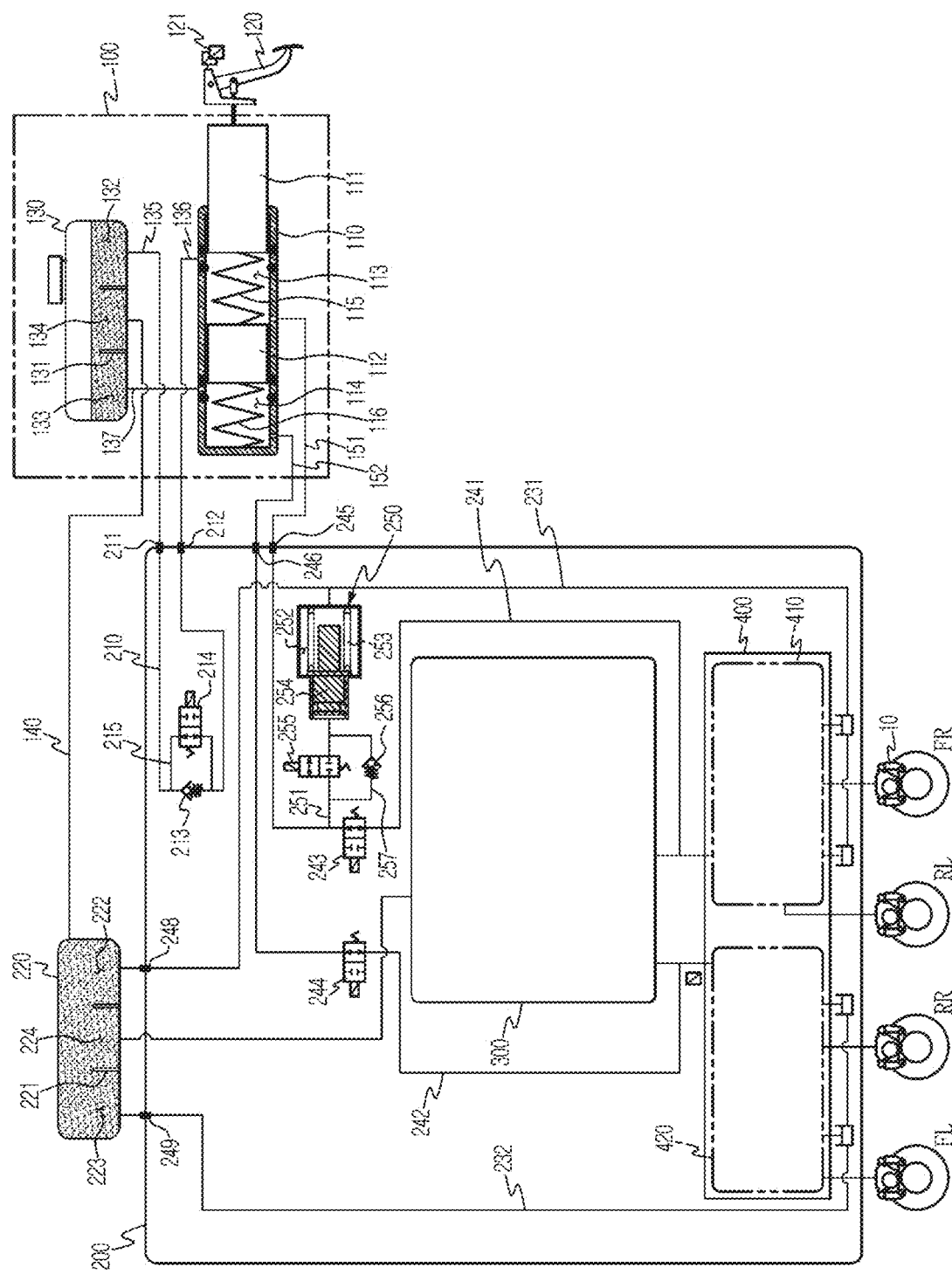
FIG. 1 is a hydraulic circuit diagram of an electronic brake system according to an embodiment of the present disclosure.

Hereinafter, embodiments of the present disclosure will be described in detail with reference to the accompanying drawings. The following embodiments are provided as examples to fully convey the spirit of the present disclosure to a person having ordinary skill in the art to which the present disclosure belongs. The present disclosure is not limited to the embodiments shown herein but may be embodied in other forms. In order to clearly explain the present invention, parts not related to the description are omitted from the drawings, and the width, length, thickness, etc. of the components may be exaggerated for convenience. Like reference numerals refer to like elements throughout this specification.

Figure 2:
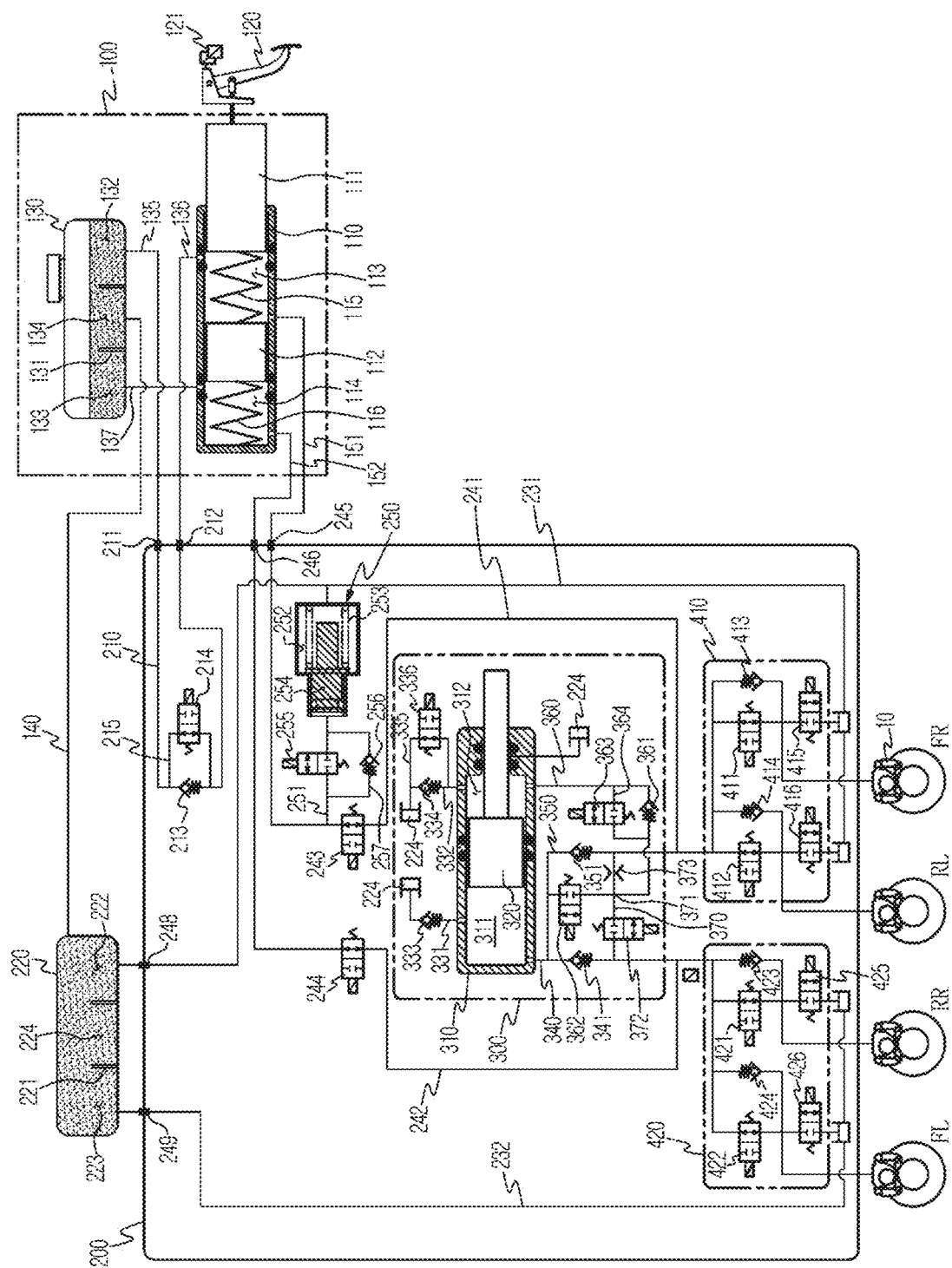
FIG. 2 is a hydraulic circuit diagram illustrating an example of a hydraulic pressure supply device and a hydraulic control unit according to an embodiment of the present disclosure.

FIG. 1 is a hydraulic circuit diagram of an electronic brake system according to an embodiment of the present disclosure, and FIG. 2 is a hydraulic circuit diagram illustrating an example of a hydraulic pressure supply device and a hydraulic control unit according to an embodiment of the present disclosure.

Referring to FIGS. 1 and 2, an electronic brake system according to an embodiment of the present disclosure includes a master cylinder unit 100 including a master cylinder 110, and a hydraulic block 200 disposed in an engine room of a vehicle in a state of being separated and spaced apart from the master cylinder unit 100.

The hydraulic block 200 may be provided with a hydraulic pressure supply device 300 for generating a hydraulic pressure by being operated by an electrical signal outputted in response to a displacement of a brake pedal 120, and a hydraulic control unit 400 for transmitting the hydraulic pressure discharged from the hydraulic pressure supply device 300 to wheel cylinders 10 provided in each wheel.

The master cylinder unit 100 and the hydraulic block 200 are mounted in the engine room of the vehicle in a state of being separated from each other and provided such that oil may flow therebetween through a hose or a pipe.

Accordingly, the degree of the freedom of design may be increased by securing an installation space without being limited by the narrow installation space of the engine room of the vehicle.

The master cylinder unit 100 includes the master cylinder 110 including a first piston 111 and a second piston 112 that move in response to a pressing force of the brake pedal 120, and a master cylinder reservoir 130 coupled to the master cylinder 110 to provide oil to a first master chamber 113 and a second master chamber 114 partitioned by the first piston 111 and the second piston 112.

A first spring 115 and a second spring 116, which are compression coil springs, are disposed in the first master chamber 113 and the second master chamber 114, respectively, to elastically support the corresponding first and second pistons 111 and 112 and to return the first and second pistons 111 and 112 to the original positions when the pressing force of the brake pedal 120 is released.

The master cylinder reservoir 130 is coupled to the master cylinder 110. The drawings illustrate separate states for convenience of explanation.

The master cylinder reservoir 130 includes a plurality of reservoir chambers 132, 133 and 134 divided by partitions 131. As an example, the plurality of reservoir chambers 132, 133 and 134 include three of the reservoir chambers 132, 133 and 134 divided by two of the partitions 131, and three of the reservoir chambers 132, 133 and 134 communicate with each other through cut holes (not shown) formed on two of the partitions 131 to have the same pressure. In this embodiment, three reservoir chambers are provided, but the number of reservoir chambers may be changed as needed.

The first reservoir chamber 132 may be connected to the first master chamber 113 of the master cylinder 110, and the second reservoir chamber 133 may be connected to the second master chamber 114 of the master cylinder 110.

The first reservoir chamber 132 may be connected to the first master chamber 113 via an inspection flow passage 210 formed in the hydraulic block 200.

The hydraulic block 200 is provided with an inspection flow passage inlet port 211, an inspection flow passage outlet port 212, the inspection flow passage 210 provided with an inspection flow passage check valve 213 which connects the inspection flow passage inlet port 211 and the inspection flow passage outlet port 212 and allows the flow of oil only to the inspection flow passage outlet port 212, and a bypass inspection flow passage 215 connected in parallel to the inspection flow passage 210 in the front and rear of the inspection flow passage check valve 213 and provided with an inspection valve 214.

The inspection valve 214 may be configured as a normally open valve and may be selectively switched to the closed state when an inspection mode is executed to determine whether the piston is stuck or leakage of the flow passage occurs.

Further, the inspection valve 214 may be switched to the closed state according to the braking condition to block the hydraulic pressure in the master cylinder 110 from being supplied to the master cylinder reservoir 130.

The inspection flow passage inlet port 211 and the first reservoir chamber 132 are connected to each other through a first reservoir hose 135, and the inspection flow passage outlet port 212 and the first master chamber 113 of the master cylinder 110 are connected to each other through a second reservoir hose 136.

The first reservoir hose 135 and the second reservoir hose 136 may be connected to the corresponding ports 211 and 212 by a one-touch fitting or a quick connector and may be provided with a separate valve for opening and closing a flow passage thereof.

The second master chamber 114 of the master cylinder 110 and the second reservoir chamber 133 may be connected to each other by connecting a reservoir pipe 137 to an oil port of the master cylinder 110.

The third reservoir chamber 134 of the master cylinder reservoir 130 may be connected to a hydraulic block reservoir 220 coupled to the hydraulic block 200 through a connection hose 140.

Therefore, because three of the reservoir chambers 132, 133 and 134 divided by the partitions 131 are configured to allow the oil to flow into and out of different places, stable oil supply is possible without affecting each other.

The hydraulic block reservoir 220 may receive the oil from the master cylinder reservoir 130 through the connection hose 140.

The hydraulic block reservoir 220 may be connected to the hydraulic pressure supply device 300, the hydraulic control unit 400, and a simulator device 250 provided in the hydraulic block 200.

The hydraulic block reservoir 220 may include three of hydraulic block reservoir chambers 222, 223 and 224 that are divided by the partitions 221.

The first hydraulic block reservoir chamber 222 may be connected to a first hydraulic circuit 410 of the hydraulic control unit 400, and the second hydraulic block reservoir chamber 223 may be connected to a second hydraulic circuit 420 of the hydraulic control unit 400.

The hydraulic block 200 is provided with a first hydraulic block reservoir flow passage 231 for connecting the first hydraulic block reservoir chamber 222 and the first hydraulic circuit 410, and a second hydraulic block reservoir flow passage 232 for connecting the second hydraulic block reservoir chamber 223 and the second hydraulic circuit 420.

The hydraulic block 200 may be provided with a first reservoir outlet port 248 connected to the first hydraulic block reservoir chamber 222 and a second reservoir outlet port 249 connected to the second hydraulic block reservoir chamber 223. The first hydraulic block reservoir flow passage 231 may connect the first hydraulic block reservoir chamber 222 and the first hydraulic circuit 410 by being connected to the first reservoir outlet port 248, and the second hydraulic block reservoir flow passage 232 may connect the second hydraulic block reservoir chamber 223 and the second hydraulic circuit 420 by being connected to the second reservoir outlet port 249.

The first hydraulic block reservoir flow passage 231 and the second hydraulic block reservoir flow passage 232 may be connected to the first reservoir outlet port 248 and the second reservoir outlet port 249, respectively, by a one-touch fitting or a quick connector.

The first hydraulic block reservoir flow passage 231 may be connected to the simulator device 250 between the hydraulic block reservoir 220 and the first hydraulic circuit 410.

The third hydraulic block reservoir chamber 224 may be connected to the hydraulic pressure supply device 300 through a dump flow passage, which will be described later.

The hydraulic block 200 may be provided with backup flow passages 241 and 242 connected to the first master chamber 113 and the second master chamber 114 of the master cylinder 110, respectively.

The hydraulic block 200 is also provided with a first backup flow passage connection port 245 for connecting the first backup flow passage 241 to the first master chamber 113, and a second backup flow passage connection port 246 for connecting the second backup flow passage 242 to the second master chamber 114.

The first backup flow passage connection port 245 may be connected to the first master chamber 113 through a first master hose 151, and the second backup flow passage connection port 246 may be connected to the second master chamber 114 through a second master hose 152.

The first master hose 151 and the second master hose 152 may be connected to the corresponding ports 245 and 246 by a one-touch fitting or a quick connector and may be provided with a separate valve for opening and closing a flow passage thereof.

The first and second backup flow passages 241 and 242, which are provided to directly supply the hydraulic pressure discharged from the master cylinder 110 to the hydraulic control unit 400 when the hydraulic pressure supply device 300 does not operate normally, are provided with cut valves 243 and 244 for controlling the flow of hydraulic pressure.

The first backup flow passage 241 may supply the hydraulic pressure to the first hydraulic circuit 410 constituting the hydraulic control unit 400, and the second backup flow passage 242 may supply the hydraulic pressure to the second hydraulic circuit 420 constituting the hydraulic control unit 400.

The first hydraulic circuit 410 may be configured to control the hydraulic pressure provided to a front right wheel FR and a rear left wheel RL of the vehicle, and the second hydraulic circuit 420 may be configured to control the hydraulic pressure provided to a front left wheel FL and a rear right wheel RR of the vehicle.

The first and second hydraulic circuits 410 and 420 may include first to fourth inlet valves 411, 412, 421, and 422, respectively, to control the flow and hydraulic pressure of the brake fluid transmitted to the first to fourth wheel cylinders 10.

The first to fourth inlet valves 411, 412, 421, and 422 may be configured as normally open type solenoid valves.

The first and second hydraulic circuits 410 and 420 may include first to fourth check valves 413, 414, 423, and 424 provided to be connected in parallel to the first to fourth inlet valves 411, 412, 421, and 422, respectively.

The first to fourth check valves 413, 414, 423, and 424 may be provided on bypass flow passages connecting the front and rear of the first to fourth inlet valves 411, 412, 421, and 422 in the first and second hydraulic circuits 410 and 420, and allow only the flow of braking fluid from each of the wheel cylinders to the hydraulic pressure supply device 300.

The first hydraulic circuit 410 may include first and second outlet valves 415 and 416 connected to the first hydraulic block reservoir chamber 222 of the hydraulic block reservoir 220 in order to improve the performance in releasing the braking of the wheel cylinders 10 of the front right wheel FR and the rear left wheel RL of the vehicle.

The first and second outlet valves 415 and 416 control the flow of brake fluid exiting the wheel cylinders 10 by being connected to the wheel cylinders 10 of the front right wheel FR and the rear left wheel RL, respectively.

The first and second outlet valves 415 and 416 may be provided as normally closed type solenoid valves that may sense a braking pressure of the wheel cylinders 10 of the front right wheel FR and the rear left wheel RL and control the depressurization of the wheel cylinders 10 by being selectively opened when depressurization braking is required.

The second hydraulic circuit 420 may include third and fourth outlet valves 425 and 426 connected to the second hydraulic block reservoir chamber 223 of the hydraulic block reservoir 220 in order to improve performance when the braking of the wheel cylinders 10 of the front right wheel FR and the rear left wheel RL of the vehicle are released.

The third and fourth outlet valves 425 and 426 control the flow of brake fluid exiting the wheel cylinders 10 by being connected to the wheel cylinders 10 of the front left wheel FL and the rear right wheel RR, respectively.

The third and fourth outlet valves 425 and 426 may be provided as normally closed type solenoid valves that may sense a braking pressure of the wheel cylinders 10 of the front left wheel FL and the rear right wheel RR and control the depressurization of the wheel cylinders 10 by being selectively opened when depressurization braking is required.

The hydraulic block 200 is provided with the simulator device 250 connected to the first backup flow passage 241 and provides a reaction force according to the pressing force of the brake pedal 120.

The simulator device 250 includes a reaction force piston 254 supported by a reaction force spring 253 in a simulator chamber 252 connected to a simulator flow passage 251 branched from the first backup flow passage 241 on a front end side of the first cut valve 243.

A rear end side of the simulator chamber 252 is connected to the first hydraulic block reservoir chamber 222 of the hydraulic block reservoir 220 coupled to the hydraulic block 200.

A normally closed type simulator valve 255 for controlling the supply of oil to the simulator chamber 252 is provided on the simulator flow passage 251.

A simulator bypass flow passage 257, on which a simulator check valve 256 connected in parallel to the front and rear of the simulator valve 255 and allowing the flow of oil only to the first backup flow passage 241 is provided, is connected to the simulator flow passage 251.

Accordingly, when the driver applies pressure to the brake pedal 120, the simulator valve 255 is opened and the oil supplied through the first backup flow passage 241 is supplied to the simulator chamber 252 to press the reaction force piston 254, and when the pressure applied to the brake pedal 120 is released, the reaction force piston 254 is returned to the original position by the reaction force spring 253.

The hydraulic pressure supply device 300 provides a hydraulic pressure to be transmitted to the hydraulic control unit 400.

The hydraulic pressure supply device 300 includes a hydraulic piston 320 that moves in a cylinder block 310 by driving an actuator such as a motor, a pump, a high-pressure accumulator, or the like, which is activated by a signal of a pedal displacement sensor 121 that senses the displacement of the brake pedal 120.

In the cylinder block 310, a first pressure chamber 311 and a second pressure chamber 312 are formed with the hydraulic piston 320 interposed therebetween.

The first pressure chamber 311 and the second pressure chamber 312 may be connected to the hydraulic block reservoir 220 through a first dump flow passage 331 and a second dump flow passage 332, respectively.

Specifically, the first pressure chamber 311 and the second pressure chamber 312 may be connected to the third hydraulic block reservoir chamber 224, which is not connected to the hydraulic control unit 400, among the plurality of hydraulic block reservoir chambers 222, 223 and 224 partitioned by the partitions 221 in the hydraulic block reservoir 220.

The first dump flow passage 331 may be provided with a first dump check valve 333 which allows only the flow of oil from the hydraulic block reservoir 220 to the first pressure chamber 311.

The second dump flow passage 332 may be provided with a second dump check valve 334 which allows only the flow of oil from the hydraulic block reservoir 220 to the second pressure chamber 312.

The second dump flow passage 332 may be provided with a dump bypass flow passage 335 connected in parallel to the front and rear of the second dump check valve 334, and the dump bypass flow passage 335 may be provided with a normally open type dump valve 336 for controlling the bidirectional flow of oil between the hydraulic block reservoir 220 and the second pressure chamber 312.

The hydraulic pressure supply device 300 may include a plurality of hydraulic flow passages and valves for transmitting the hydraulic pressure generated in the first and second pressure chambers 311 and 312 to the hydraulic control unit 400.

As an example, the plurality of hydraulic flow passages may include first to fourth hydraulic flow passages 340, 350, 360 and 370.

The first hydraulic flow passage 340 may connect the first pressure chamber 311 and the second hydraulic circuit 420, and the second hydraulic flow passage 350 may be branched from the first hydraulic flow passage 340 to connect the first pressure chamber 311 and the first hydraulic circuit 410.

The first hydraulic flow passage 340 and the second hydraulic flow passage 350 may transmit the hydraulic pressure in the first pressure chamber 311 generated by the forward movement of the hydraulic piston 320 to the hydraulic control unit 400.

The first hydraulic flow passage 340 and the second hydraulic flow passage 350 may be provided with a first check valve 341 and a second check valve 351 which allow the flow of oil toward the hydraulic control unit 400, respectively.

In this case, the second hydraulic flow passage 350 may be branched from the first hydraulic flow passage 340 on a front end side of the first check valve 341.

The third hydraulic flow passage 360 may connect the second pressure chamber 312 and the second hydraulic flow passage 350 on a front end side of the second check valve 351.

The third hydraulic flow passage 360 may be provided with a third check valve 361 for allowing the flow of oil only to the second hydraulic flow passage 350, and the third hydraulic flow passage 360 on a rear end side of the third check valve 361 may be provided with a first control valve 362 for controlling the flow of oil.

A bypass hydraulic flow passage 364 that is connected in parallel to the front and rear of the third check valve 361 and provided with a second control valve 363 may be connected to the third hydraulic flow passage 360.

The fourth hydraulic flow passage 370 may connect the first hydraulic flow passage 340 on a rear end side of the first check valve 341, the second hydraulic flow passage 350 on a rear end side of the second check valve 351, and the third hydraulic flow passage 360 positioned between the first control valve 362 and the third check valve 361.

On the basis of a joining point 371 where the third hydraulic flow passage 360 and the fourth hydraulic flow passage 370 meet, a third control valve 372 may be provided on the fourth hydraulic flow passage 370 connected to the first hydraulic flow passage 340, and an orifice 373 may be provided on the fourth hydraulic flow passage 370 connected to the second hydraulic flow passage 350.

The first control valve 362, the second control valve 363, and the third control valve 372 are configured as normally closed type solenoid valves so that the corresponding flow passages may be selectively opened and closed as needed.

As an example, at least one of the first and third control valves 362 and 372 may be switched to the open state so as to transmit the hydraulic pressure in the first pressure chamber 311 generated by the forward movement of the hydraulic piston 320 to the hydraulic control unit 400.

In this case, the second control valve 363 may be switched to the open state in order to provide a part of the hydraulic pressure generated in the first pressure chamber 311 to the second pressure chamber 312.

As another example, the second control valve 363 and the third control valve 372 may be switched to the open state so as to transmit the hydraulic pressure in the second pressure chamber 312 generated by the backward movement of the hydraulic piston 320 to the hydraulic control unit 400.

Accordingly, the hydraulic pressure discharged from the second pressure chamber 312 and provided to the third hydraulic flow passage 360 may be transmitted to the first and second hydraulic flow passages 340 and 350 through the fourth hydraulic flow passage 370.

As is apparent from the above, the electronic brake system according to the embodiment of the present disclosure can be easily mounted in a narrow engine room of a vehicle and can maintain stable braking performance.

Although a few embodiments of the present disclosure have been shown and described, it would be appreciated by those skilled in the art that various changes in form and details may be made therein without departing from the spirit and scope of the present disclosure as defined by the appended claims.

What is claimed is:

1. An electronic brake system comprising:
a master cylinder unit including a master cylinder to generate a hydraulic pressure and a master cylinder reservoir coupled to the master cylinder to store oil;
a hydraulic block provided with a hydraulic pressure supply device to generate the hydraulic pressure by a hydraulic piston actuated by an electrical signal outputted in response to a displacement of a brake pedal, and a hydraulic control unit including inlet valves and outlet valves to transmit the hydraulic pressure discharged from the hydraulic pressure supply device to wheel cylinders provided in each wheel, and disposed to be separated from the master cylinder unit;
a hydraulic block reservoir to supply oil to the hydraulic block side or store discharged oil, and
a connection hose to connect the master cylinder reservoir and the hydraulic block reservoir,
wherein the master cylinder reservoir includes a plurality of reservoir chambers divided by partitions,
one of the plurality of reservoir chambers is connected to a first master chamber of the master cylinder, another is connected to a second master chamber of the master cylinder, and another one of the plurality of reservoir chambers is connected to the hydraulic block reservoir.

2. The electronic brake system according to claim 1, wherein
the hydraulic block further includes reservoir outlet ports connected to reservoir chambers of the hydraulic block reservoir to transmit oil discharged from the outlet valves.

3. The electronic brake system according to claim 2, wherein
the reservoir outlet ports include a first reservoir outlet port connected to one of the reservoir chambers of the hydraulic block reservoir and a second reservoir outlet port connected to the other of the reservoir chambers of the hydraulic block reservoir.

4. The electronic brake system according to claim 3, wherein
the hydraulic control unit includes a first hydraulic circuit to control the hydraulic pressure transmitted to two of the wheel cylinders and a second hydraulic circuit to control the hydraulic pressure transmitted to the other two wheel cylinders, and
the hydraulic block further includes a first hydraulic block reservoir flow passage to connect the first reservoir outlet port and the first hydraulic circuit, and a second hydraulic block reservoir flow passage to connect the second reservoir outlet port and the second hydraulic circuit.

5. The electronic brake system according to claim 1, wherein
the hydraulic block includes backup flow passage connection ports connected to the other master chamber of the master cylinder,
wherein the backup flow passage connection ports include a first backup flow passage connection port connected to a first master chamber of the master cylinder and a second backup flow passage connection port connected to a second master chamber of the master cylinder.

6. The electronic brake system according to claim 5, wherein
the hydraulic control unit includes a first hydraulic circuit to control the hydraulic pressure transmitted to two of the wheel cylinders and a second hydraulic circuit to control the hydraulic pressure transmitted to the other two wheel cylinders, and
the electronic brake system further comprises a first backup flow passage to connect the first backup flow passage connection port and the first hydraulic circuit, and a second backup flow passage to connect the second backup flow passage connection port and the second hydraulic circuit.

7. The electronic brake system according to claim 1, wherein
the hydraulic block includes an inspection flow passage inlet port connected to a reservoir chamber of the master cylinder reservoir, an inspection flow passage outlet port connected to one of two master chambers of the master cylinder, and backup flow passage connection ports connected to the other master chamber of the master cylinder.

8. An electronic brake system comprising:
a master cylinder unit including a master cylinder to generate a hydraulic pressure and a master cylinder reservoir coupled to the master cylinder to store oil;
a hydraulic block provided with a hydraulic pressure supply device to generate the hydraulic pressure by a hydraulic piston actuated by an electrical signal outputted in response to a displacement of a brake pedal, and a hydraulic control unit including inlet valves and outlet valves to transmit the hydraulic pressure discharged from the hydraulic pressure supply device to wheel cylinders provided in each wheel, and disposed to be separated from the master cylinder unit;
a hydraulic block reservoir coupled to the hydraulic block to supply oil to the hydraulic pressure supply device and connected to the outlet valves to store oil discharged from the outlet valves;
a connection hose to connect the master cylinder reservoir and the hydraulic block reservoir; and
wherein:
the master cylinder reservoir includes a plurality of reservoir chambers divided by partitions,
one of the plurality of reservoir chambers is connected to a first master chamber of the master cylinder, another is connected to a second master chamber of the master cylinder, and
another one of the plurality of reservoir chambers is connected to the hydraulic block reservoir.

9. The electronic brake system according to claim 8, wherein
the hydraulic block includes an inspection flow passage inlet port connected to a reservoir chamber of the master cylinder reservoir, an inspection flow passage outlet port connected to one of two master chambers of the master cylinder, an inspection flow passage connecting the inspection flow passage inlet port and the inspection flow passage outlet port and provided with an inspection flow passage check valve to allow the flow of oil only to the inspection flow passage outlet port, and an inspection valve provided on a bypass inspection flow passage connected to the inspection flow passage in the front and rear of the inspection flow passage check valve.

10. The electronic brake system according to claim 8, wherein
the hydraulic block includes an inspection flow passage inlet port connected to a reservoir chamber of the master cylinder reservoir,
another one of the plurality of reservoir chambers is connected to the inspection flow passage inlet port.

11. The electronic brake system according to claim 8, wherein
the hydraulic block includes hydraulic flow passages to supply the hydraulic pressure supplied from the hydraulic pressure supply device to the hydraulic pressure control unit, backup flow passage connection ports connected to master chambers of the master cylinder, and backup flow passages connecting the backup flow passage connection ports and the hydraulic flow passages and provided with cut valves.

12. The electronic brake system according to claim 11, wherein
the hydraulic control unit includes a first hydraulic circuit to control the hydraulic pressure transmitted to two of the wheel cylinders and a second hydraulic circuit to control the hydraulic pressure transmitted to the other two wheel cylinders, and
the backup flow passages include a first backup flow passage connected to the first hydraulic circuit and one of the two master chambers of the master cylinder, and a second backup flow passage connected to the second hydraulic circuit and the other one of the two master chambers of the master cylinder.

13. The electronic brake system according to claim 12, wherein
- a simulator device is connected to the first backup flow passage to provide a reaction force in response to a pressing force of the brake pedal.

14. The electronic brake system according to claim 13, wherein
- the simulator device includes a simulator chamber which stores oil supplied from a simulator flow passage branched from the first backup flow passage and in which a reaction force piston supported by a reaction force spring is disposed, and
- a simulator valve is provided on the simulator flow passage on a front side of the simulator chamber, and a rear end side of the simulator chamber is connected to the hydraulic block reservoir.

15. The electronic brake system according to claim 11, wherein
- the backup flow passages include a first backup flow passage connected to a first hydraulic circuit of the hydraulic control unit and a second backup flow passage connected to a second hydraulic circuit of the hydraulic control unit, and
- the first backup flow passage is connected to a first master chamber of the master cylinder by a first master hose connecting the first master chamber and a first backup flow passage connection port of the hydraulic block, and the second backup flow passage is connected to a second master chamber of the master cylinder by a second master hose connecting the second master chamber and a second backup flow passage connection port of the hydraulic block.

16. The electronic brake system according to claim 8, wherein
- the hydraulic block reservoir includes a plurality of hydraulic block reservoir chambers divided by partitions, and
- one of the plurality of hydraulic block reservoir chambers is connected to a first hydraulic circuit of the hydraulic control unit, another is connected to a second hydraulic circuit of the hydraulic control unit, and another is connected to a pressure chamber of the hydraulic pressure supply device.

17. The electronic brake system according to claim 8, wherein
- the hydraulic block reservoir includes a plurality of hydraulic block reservoir chambers divided by partitions, and
- the hydraulic block includes a first hydraulic block reservoir flow passage connected to one of the plurality of hydraulic block reservoir chambers and a first hydraulic circuit of the hydraulic control unit, and a second hydraulic block reservoir flow passage connected to another one of the plurality of hydraulic block reservoir chambers and a second hydraulic circuit of the hydraulic control unit.

18. The electronic brake system according to claim 17, wherein
- the first hydraulic block reservoir flow passage is connected to a simulator chamber of a simulator device configured to provide a reaction force.

19. An electronic brake system comprising:
- a master cylinder unit including a master cylinder to generate a hydraulic pressure and a master cylinder reservoir coupled to the master cylinder to store oil;
- a hydraulic block provided with a hydraulic pressure supply device to generate the hydraulic pressure by a hydraulic piston actuated by an electrical signal outputted in response to a displacement of a brake pedal, and a hydraulic control unit including inlet valves and outlet valves to transmit the hydraulic pressure discharged from the hydraulic pressure supply device to wheel cylinders provided in each wheel, and disposed to be separated from the master cylinder unit;
- a hydraulic block reservoir coupled to the hydraulic block to supply oil to the hydraulic pressure supply device and connected to the outlet valves to store oil discharged from the outlet valves;
- a connection hose to connect the master cylinder reservoir and the hydraulic block reservoir; and
- wherein:
- the master cylinder reservoir includes a plurality of reservoir chambers divided by partitions,
- one of the plurality of reservoir chambers is connected to a first master chamber of the master cylinder, another is connected to a second master chamber of the master cylinder, and
- the hydraulic pressure supply device includes a cylinder block in which the hydraulic piston is accommodated, a first pressure chamber provided at one side of the hydraulic piston in the cylinder block to be connected to the wheel cylinder, and a second pressure chamber provided at the other side of the hydraulic piston in the cylinder block to be connected to the wheel cylinder.

* * * * *